United States Patent
Liang et al.

(10) Patent No.: US 12,555,354 B2
(45) Date of Patent: Feb. 17, 2026

(54) FEW-SHOT IMAGE RECOGNITION METHOD AND APPARATUS, DEVICE, AND STORAGE MEDIUM

(71) Applicant: Beijing University of Posts and Telecommunications, Beijing (CN)

(72) Inventors: Kongming Liang, Beijing (CN); Zhanyu Ma, Beijing (CN); Yurong Guo, Beijing (CN); Ruoyi Du, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 300 days.

(21) Appl. No.: 18/225,353

(22) Filed: Jul. 24, 2023

(65) Prior Publication Data

US 2024/0029397 A1 Jan. 25, 2024

(30) Foreign Application Priority Data

Jul. 25, 2022 (CN) .......................... 202210879098.7

(51) Int. Cl.
 *G06V 10/74* (2022.01)
 *G06V 10/764* (2022.01)
 *G06V 10/82* (2022.01)
(52) U.S. Cl.
 CPC .......... *G06V 10/761* (2022.01); *G06V 10/764* (2022.01); *G06V 10/82* (2022.01)
(58) Field of Classification Search
 CPC .... G06V 10/82; G06V 10/761; G06V 10/764; G06V 30/19173; G06F 18/24; G06F 18/2413
 See application file for complete search history.

(56) References Cited

U.S. PATENT DOCUMENTS

| | | | | |
|---|---|---|---|---|
| 12,019,641 | B2* | 6/2024 | Kim | G06N 3/09 |
| 12,087,043 | B2* | 9/2024 | Mittal | G06V 10/82 |
| 2022/0172036 | A1* | 6/2022 | Schwartz | G06N 3/045 |

OTHER PUBLICATIONS

Cao, et al. (Few-Shot Video Classification via Temporal Alignment). (Year: 2020).*

(Continued)

*Primary Examiner* — Daniel G Mariam
(74) *Attorney, Agent, or Firm* — Scully, Scott, Murphy & Presser, P.C.

(57) ABSTRACT

The present application discloses a few-shot image recognition method and apparatus, a device, and a storage medium. The method includes: obtaining to-be-recognized images, and constructing an image episode according to the to-be-recognized image, the image episode including a support set and a query set; inputting the image episode into a pre-trained image recognition model, the image recognition model being a few-shot image recognition model based on hard episode training; and calculating a similarity between an image in the query set and each class in the support set according to the image recognition model, and determining the class of to-be-recognized images in the query set according to the similarity. According to the image recognition method provided by the embodiments of the present application, model training and image recognition can be performed by using fewer image samples, and hard episodes are fused into a training process of a few-shot image recognition model, whereby the few-shot image recognition model can be trained more efficiently and quickly, and the trained model is higher in stability and higher in accuracy of image recognition.

6 Claims, 5 Drawing Sheets

(56) References Cited

OTHER PUBLICATIONS

Liu, et al. (Few-Shot Image Classification: Current Status and Research Trends). (Year: 2022).*

* cited by examiner

FEW-SHOT IMAGE RECOGNITION METHOD AND APPARATUS, DEVICE, AND STORAGE MEDIUM

FIELD

The present application relates to the technical field of image processing, and in particular, to a few-shot image recognition method and an apparatus, a device, and a storage medium.

BACKGROUND

Deep learning has achieved great success in computer vision recognition tasks, which is mainly due to a powerful deep neural network model and a large number of trainable sample data. However, in many practical applications, it is difficult to obtain data, such as the history of disease development in patients, biomolecular structures, and pictures of rare animals and plants. And in some practical applications, the cost of data annotation is expensive. For example, in medical image segmentation tasks, an experienced physician is required to spend a significant amount of time performing detailed image annotation. However, if the model is trained using a small number of sample data, it is likely to produce over-fitting problems, which leads to low accuracy of final test results, even if a random inactivation technology is used. Faced with such problems, it is necessary to change the manner of training the model using a large number of data, and to study a model capable of achieving higher classification accuracy using a small number of samples.

Therefore, how to perform efficient model training and recognition for few-shot images is an urgent technical problem to be solved by a person skilled in the art.

SUMMARY

Embodiments of the present application provide a few-shot image recognition method and apparatus, a device, and a storage medium. The following presents a simple summary in order to provide a basic understanding of some aspects of the disclosed embodiments. This summary is not an extensive overview and is intended to neither identify key/critical elements nor delineate the protection scope of such embodiments. The sole purpose is to present some concepts in a simplified form as a prelude to the detailed description that is presented later.

In the first aspect, the embodiments of the present application provide a few-shot image recognition method, including:

obtaining to-be-recognized images, and constructing an image episode according to the to-be-recognized image, the image episode including a support set and a query set;

inputting the image episode into a pre-trained image recognition model, the image recognition model being a few-shot image recognition model based on hard episode training; and calculating the similarity between images in the query set and each class in the support set according to the image recognition model, and determining the class of to-be-recognized images in the query set according to the similarity.

In an optional embodiment, the method further includes:

calculating an intra-class distance and an inter-class distance of the image of each class in the support set according to the image recognition model; and calculating a hardness of the image episode according to the intra-class distance and the inter-class distance.

In an optional embodiment, before inputting the image episode into a pre-trained image recognition model, the method further includes:

obtaining an image dataset and a default neural network model;

randomly sampling from the image dataset to obtain a randomly-sampled episode;

inputting the randomly-sampled episode into the neural network model, and calculating a similarity between a sample in the query set of the episode and each class in the support set;

calculating a loss function of the model according to the calculated similarity, optimizing model parameters by a back-propagation algorithm, and obtaining a trained feature sampling network when the loss function converges;

calculating intra-class distances and inter-class distances of all classes in the image dataset according to the feature sampling network, and sampling a hard episode according to the intra-class distances and the inter-class distances;

inputting the hard episode into the feature sampling network, and calculating a similarity between a sample in the query set in the hard episode and each class in the support set; and calculating the loss function of the model according to the calculated similarity, optimizing the model parameters by the back-propagation algorithm, and obtaining a trained image recognition model when the loss function converges.

In an optional embodiment, random sampling from the image dataset to obtain a randomly-sampled episode includes:

obtaining image classes in the image dataset;

randomly sampling a default number of samples from each image class, and forming a support set and a query set from the sampled samples; and combining the support set and the query set into an episode to obtain the randomly-sampled episode.

In an optional embodiment, inputting the randomly-sampled episode into the neural network model and calculating a similarity between a sample in the query set of the episode and each class in the support set includes:

inputting the episode into the neural network model, and calculating a class center of each class in the support set; and calculating a similarity between the sample in the query set and the class center of each class in the support set.

In an optional embodiment, the calculating intra-class distances and inter-class distances of all classes in the image dataset according to the feature sampling network includes:

calculating the intra-class distance according to the following formula:

$$d_{intra}^{m} = \frac{1}{N_m} \sum_{i=1}^{N_m} G[F'(x_{mi}), P_m]$$

where F'(•) is a feature sampling network, G(•,•) is a squared Euclidean distance, $x_{mi}$ is the $i^{th}$ sample of class m, $N_m$ is the number of all samples of class m, $$P_m = \frac{1}{N_m}\sum_{i=1}^{N_m} F'(x_{mi})$$

is a class center of class m, and $d_{intra}^{m}$ is an intra-class distance of class m; and calculating the inter-class distance according to the following formula:

$$d_{inter}^{m,n} = G[P_m, P_n]$$

where $$P_n = \frac{1}{N_n}\sum_{i=1}^{N_n} F'(x_{ni})$$

is a class center of class n, and $d_{inter}^{m,n}$ is an inter-class distance between class m and class n.

In an optional embodiment, sampling a hard episode according to the intra-class distances and the inter-class distances includes:

randomly sampling a target class from all classes, and collecting all combinations including the target class;

calculating Inverse-Fisher values of all the collected combinations according to the intra-class distances and the inter-class distances, and ranking the combinations including the target class according to a descending order of the Inverse-Fisher values; and counting the number of combinations including the target class, randomly selecting a combination from a default number of top-ranked combinations, forming a support set and a query set according to a class set sample in the combination, and obtaining the hard episode according to the support set and the query set.

In a second aspect, the embodiments of the present application provide a few-shot image recognition apparatus, including:

an obtaining module, configured to obtain to-be-recognized images, and construct an image episode according to the to-be-recognized image, the image episode including a support set and a query set;

an input module, configured to input the image episode into a pre-trained image recognition model, the image recognition model being a few-shot image recognition model based on hard episode training; and a calculation module, configured to calculate a similarity between an image in the query set and each class in the support set according to the image recognition model, and determine the class of to-be-recognized images in the query set according to the similarity.

In a third aspect, the embodiments of the present application provide an electronic device, including a processor and a memory storing program instructions. The processor is configured to perform, when executing the program instructions, the few-shot image recognition method provided in the foregoing embodiments.

In a fourth aspect, the embodiments of the present application provide a computer-readable medium, having computer-readable instructions stored thereon. The computer-readable instructions are executed by a processor to implement the few-shot image recognition method provided in the foregoing embodiments.

The technical solutions provided by the embodiments of the present application may include the following beneficial effects.

According to the image recognition method provided by the embodiments of the present application, model training and image recognition can be performed by using fewer image samples, and hard episodes are fused into a training process of a few-shot image recognition model, whereby the few-shot image recognition model can be trained more efficiently and quickly, the stability of the model can be improved, and the accuracy of few-shot image recognition can be improved.

In addition, the few-shot image recognition method based on hard episode mining provided in the present embodiment can realize few-shot image recognition, and may also calculate a hardness of a to-be-recognized few-shot image episode and evaluate a recognition effect of the model according to the calculated hardness of the episode.

It will be appreciated that both the foregoing general description and the following detailed description are exemplary and explanatory only and are not restrictive of the present invention.

BRIEF DESCRIPTION OF THE DRAWINGS

The accompanying drawings, which are incorporated in and constitute a part of this description, illustrate embodiments consistent with the invention and, together with this description, serve to explain the principles of the present invention.

DETAILED DESCRIPTION OF EMBODIMENTS

The following description and drawings sufficiently illustrate specific embodiments of the present invention to enable a person skilled in the art to practice the specific embodiments.

It is clear that the described embodiments are only part of and not all of the embodiments of the present invention. Based on the embodiments in the present invention, all other embodiments obtained without creative effort by those of ordinary skill in the art fall within the protection scope of the present invention.

When the following description relates to the drawings, the same numerals in different drawings denote the same or similar elements unless otherwise indicated. The implementations described in the following exemplary embodiments are not representative of all implementations consistent with the present invention. Rather, the implementations are only examples of systems and methods in which some aspects of the present invention are consistent as detailed in the appended claims.

Figure 1:
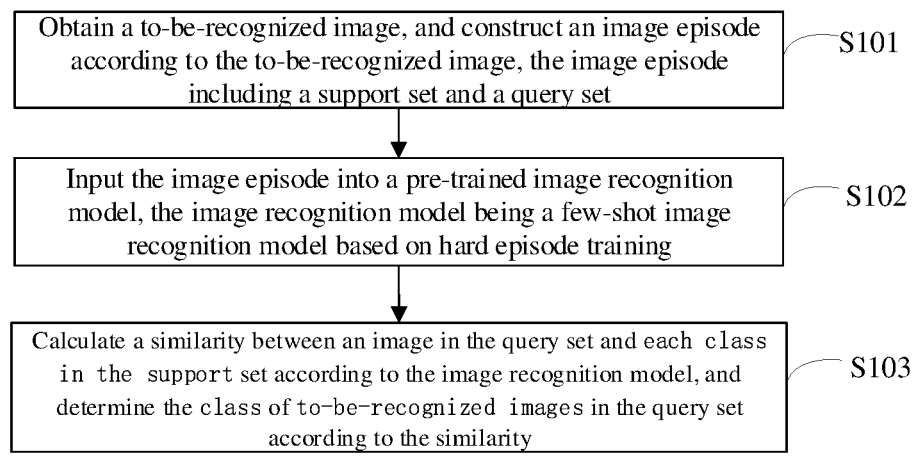
FIG. 1 is a schematic flowchart of a few-shot image recognition method according to an exemplary embodiment.

In order to solve the deficiency of the related art, the embodiments of the present application provide a few-shot image recognition method. The few-shot image recognition method provided by the embodiments of the present application will be described in detail with reference to the accompanying drawings. Referring to FIG. 1, the method specifically includes the following steps:

S101: Obtain to-be-recognized images, and construct an image episode according to the to-be-recognized image, the image episode including a support set and a query set.

In a possible implementation, to-be-recognized images are obtained. The to-be-recognized image is divided into a query set and a support set, and images in the support set are labeled.

The number of images in the support set is small. For example, only one image is labeled for each class. The support set and the query set are combined into an image episode.

S102: Input the image episode into a pre-trained image recognition model, the image recognition model being a few-shot image recognition model based on hard episode training.

Figure 2:
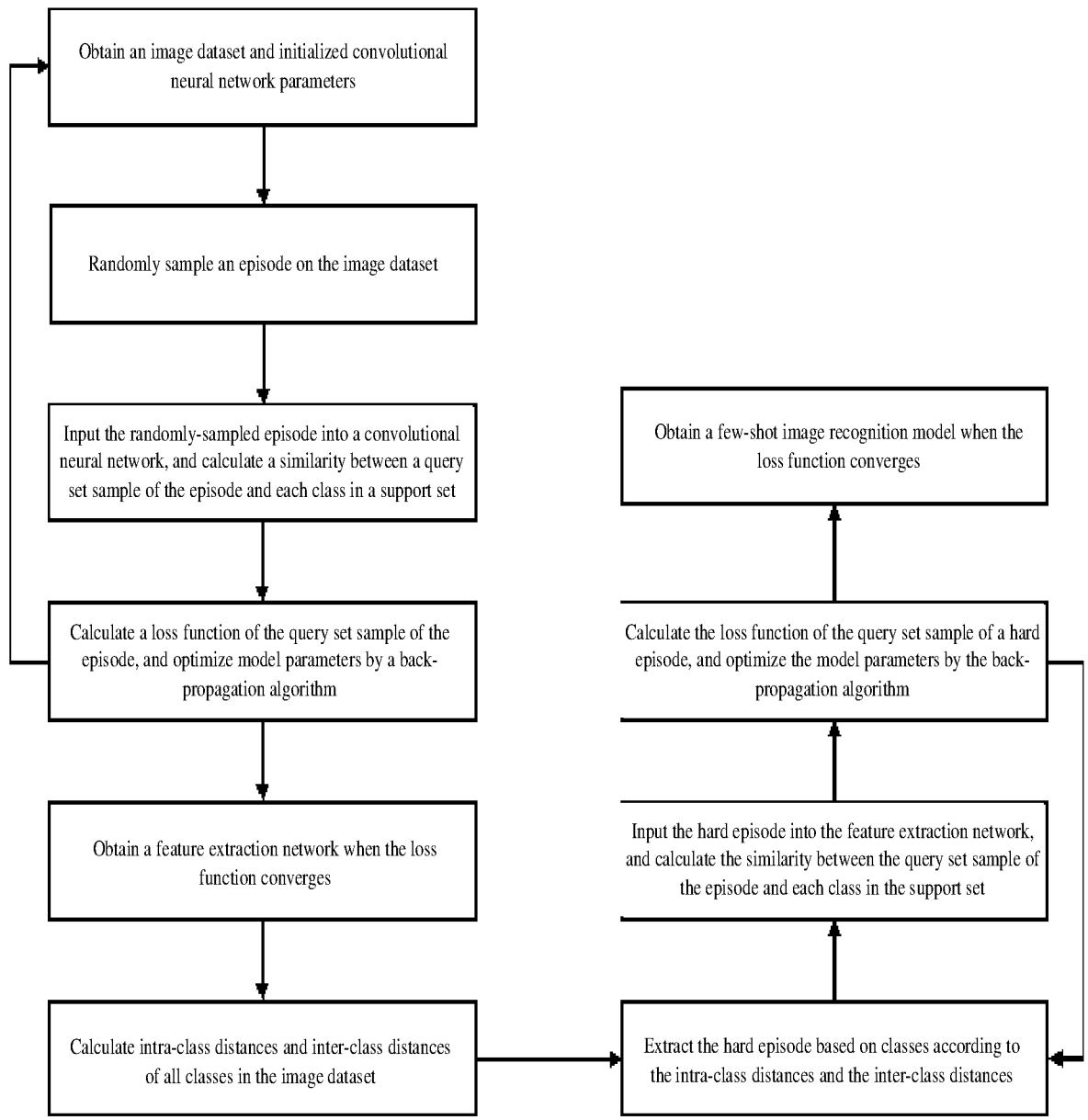
FIG. 2 is a schematic diagram of a training method for an image recognition model according to an exemplary embodiment.

In a possible implementation, before inputting the image episode into the pre-trained image recognition model, the method further includes: training the image recognition model. The training method for the image recognition model will be described in detail with reference to FIG. 2.

First, an image dataset and a default neural network model are obtained. In an embodiment, a training dataset and a default neural network model are obtained. An initialized convolutional neural network model may be used.

Second, the image dataset is randomly sampled to obtain a randomly-sampled episode. The operation includes: obtaining image classes in the image dataset; randomly sampling a default number of samples from each image class, and forming a support set and a query set from the sampled samples; and combining the support set and the query set into an episode to obtain the randomly-sampled episode.

In an embodiment, in a classification task of N-way K-shot, each constructed episode includes a support set S and a query set Q. That is, $T = S \cup Q$, and $S \cap Q = \emptyset$. First, N classes are randomly sampled, and $K+K_Q$ samples are randomly sampled from each class, where N*K samples form the support set, which is denoted as: $S = \{(s_{1,1}, c_1), \ldots, (s_{1,K}, c_1), \ldots, (s_{N,1}, c_N), \ldots, (s_{N,K}, c_N)\}$. $s_{n,k}$ represents the $k^{th}$ sample of the $n^{th}$ class in the support set, and $C_n$ represents a class to which the sample $s_{n,k}$ belongs. In addition, $N*K_Q$ samples form the query set, which is denoted as $Q = \{(q_{1,1}, c_1), \ldots, (q_{1,K_Q}, c_1), \ldots, (q_{N,1}, c_N), \ldots, (q_{N,K_Q}, c_N)\}$, and Q is simply denoted as $Q = \{q_m | m=1, \ldots NK_Q\}$. Finally, the support set and the query set are combined into an episode.

Further, the randomly-sampled episode is inputted into the neural network model, and a similarity between a sample in the query set of the episode and each class in the support set is calculated. Specifically, the episode is inputted into the neural network model to obtain corresponding features, and the class center of each class in the support set is calculated. The class center may be calculated according to the following formula:

$$C_n = \frac{1}{K} \sum_{i=1}^{K} F(s_{n,i}, \Omega)$$

where $C_n$ represents a class center of class n in a current episode, and $n \in [1, \ldots, N]$. $F(\Omega)$ represents a convolutional neural network.

Then, a similarity between the sample in the query set and the class center of each class in the support set is calculated, and the similarity may be calculated according to the following formula:

$$y_{m,n} = \mathrm{Sim}[C_n, F(q_m, \Omega)]$$

where $m \in [1, \ldots, NK_Q]$, $y_{mn}$ represents a similarity between the $m^{th}$ sample in the query set and class n, and $\mathrm{Sim}[\cdot, \cdot]$ represents a cosine similarity measure function.

Further, a loss function of the model is calculated according to the calculated similarity, model parameters are optimized by a back-propagation algorithm, and a trained feature sampling network is obtained when the loss function converges.

In a possible implementation, the loss function of the model is calculated according to the following formula:

$$L = \frac{1}{NK_Q N} \sum_{m=1}^{NK_Q} \sum_{n=1}^{N} L_{CE}(y_{m,n}, \Omega)$$

where $L_{CE}$ is a cross-entropy loss function.

The foregoing steps are repeated, and a preliminarily trained feature sampling network $F'(\Omega)$ is obtained when the loss function converges.

Further, intra-class distances and inter-class distances of all classes in the image dataset are calculated according to the feature sampling network, all the samples are inputted into the feature sampling network to obtain corresponding features, and then the intra-class distances of all the classes are calculated according to the following formula:

$$d_{intra}^{m} = \frac{1}{N_m} \sum_{i=1}^{N_m} G[F'(x_{mi}), P_m]$$

where $F'(\cdot)$ is a feature sampling network, $G(\cdot, \cdot)$ is a squared Euclidean distance, $x_{mi}$ is the $i^{th}$ sample of class m, $N_m$ is the number of all samples of class m, $$P_m = \frac{1}{N_m} \sum_{i=1}^{N_m} F'(x_{mi})$$

is a class center of class m, and $d_{intra}^{m}$ is an intra-class distance of class m.

The inter-class distances of all the classes are calculated according to the following formula:

$$d_{inter}^{m,n} = G[P_m, P_n]$$

where $$P_n = \frac{1}{N_n} \sum_{i=1}^{N_n} F'(x_{ni})$$

is a class center of class n, and $d_{inter}^{m,n}$ is an inter-class distance between class m and class n.

Further, a hard episode is sampled according to the intra-class distances and the inter-class distances. The operation includes: randomly sampling a target class from all the classes, and collecting all combinations including the target class; calculating Inverse-Fisher values of all the collected combinations according to the intra-class distances and the inter-class distances, and ranking the combinations including the target class according to a descending order of the Inverse-Fisher values; and counting the number of combinations including the target class, randomly selecting a combination from a default number of top-ranked combinations, forming a support set and a query set according to a class set sample in the combination, and obtaining the hard episode according to the support set and the query set.

Figure 4:
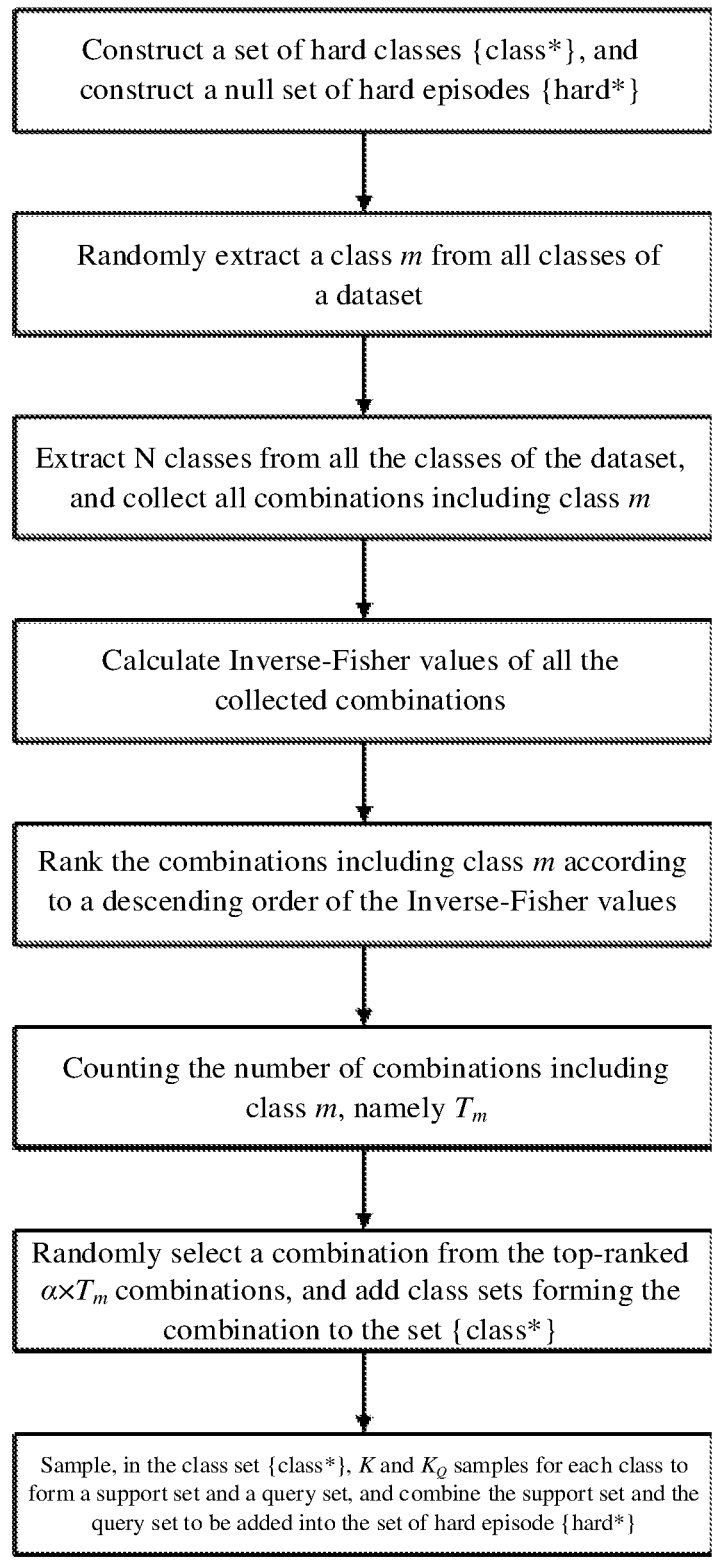
FIG. 4 is a schematic diagram of a hard episode sampling method according to an exemplary embodiment.

Specifically, the step of sampling a hard episode, as shown in FIG. 4, includes the following sub-steps:
1: Construct a null set of hard classes {class*}, and construct a null set of hard episodes {hard*}.
2: Randomly sample a target class m from all classes {1, 2, ..., C}.
3: Extract N classes from {1, 2, ..., C}, and collect all combinations including the target class m, the combinations being uniformly denoted as {$C_1, C_2, ..., C_N$}.
4: Calculate Inverse-Fisher values of all the collected combinations, namely:

$$D_{intra/inter} = \frac{d_{intra}}{d_{inter}} = \frac{\frac{1}{N}\sum_{i=1}^{N} d_{intra}^{C_i}}{N\frac{1}{N(N-1)}\sum_{i=1}^{N}\sum_{j=1,j\neq i}^{N} d_{inter}^{C_i,C_j}}$$

5: Rank the combinations including the target class m according to a descending order of the Inverse-Fisher values.
6: Counting the number of combinations including the target class m, namely $T_m$.
7: Randomly select a combination from the top-ranked $\alpha \times T_m$ combinations, and add class sets forming the combination to the set {class*}.
8: Sample, in the class set {class*}, K and $K_Q$ samples for each class to form a support set and a query set, and combine the support set and the query set to be added into the hard episode {hard*}, the support set of the hard episode being S'={$(s'_{1,1},c_1), ..., (s'_{1,K},c_1), ..., (s'_{N,1},c_N), ..., (s'_{N,K},c_N)$}, where $s'_{n,k}$ represents the $k^{th}$ sample of the $n^{th}$ class in the support set of the hard episode, and $C_n$ represents a class to which the sample $s'_{n,k}$ belongs. In addition, $N*K_Q$ samples form the query set, which is denoted as Q'={$(q'_{1,1},c_1), ..., (q'_{1,K_Q},c_1), ..., (q'_{N,1},c_N), ..., (q'_{N,K_Q},c_N)$}, and Q is simply denoted as Q'={$q'_m$|m=1, ... $NK_Q$}.

Further, the hard episode is inputted into the feature sampling network, and a similarity between a sample in the query set in the hard episode and each class in the support set is calculated. The operation includes: inputting the sampled hard episode into the trained feature sampling network to obtain corresponding features. Then, the class center of each class in the support set is calculated according to the following formula:

$$C'_n = \frac{1}{K}\sum_{i=1}^{K} F'(s'_{ni}, \Omega)$$

where $C'_n$ represents the class center of class n in the current hard episode, and n∈[1, ..., N].

Further, a similarity between the sample in the query set and the class center of the support set is calculated, namely:

$$y'_{m,n} = Sim[C'_n, F'(q'_m, \Omega)]$$

where m∈[1, ..., $NK_Q$], $y'_{mn}$ represents a similarity between the $m^{th}$ sample in the query set and class n, and Sim[•,•] represents a cosine similarity measure function.

Further, the loss function of the model is calculated according to the calculated similarity, the model parameters are optimized by the back-propagation algorithm, and a trained image recognition model is obtained when the loss function converges.

In an embodiment, the loss function of the model is calculated according to the following formula:

$$L' = \frac{1}{NK_Q N}\sum_{m=1}^{NK_Q}\sum_{n=1}^{N} L_{CE}(y'_{m,n}, \Omega)$$

where $L_{CE}$ is a cross-entropy loss function.

The foregoing steps of sampling a hard episode and training a model according to the hard episode are repeated, trained model parameters are obtained when the loss function converges, and then a trained image recognition model is obtained.

The few-shot image recognition model training method based on hard episode mining provided by the embodiments of the present application shows an efficient hard episode searching method. Also, hard episodes are fused into a training process of a few-shot image recognition model, whereby the few-shot image recognition model can be trained more efficiently and quickly, the stability of the model can be improved, and the accuracy of few-shot image recognition can be improved.

S103: Calculate a similarity between an image in the query set and each class in the support set according to the image recognition model, and determine the class of to-be-recognized images in the query set according to the similarity.

In a possible implementation, after inputting the to-be-recognized image episode into the trained image recognition model, the image recognition model calculates the similarity between the image in the query set and the class center in the support set. Similarity sets $\hat{y}_m = \{\hat{y}_{m,n}\}_{n=1}^{N}$ are obtained, where $\hat{y}_{m,n}$ represents a similarity between the $m^{th}$ sample in the query set and class n.

Further, the similarity sets $\hat{y}_m$ are ranked, and value n corresponding to a maximum value is a few-shot image recognition result of sample m.

In an optional embodiment, the method further includes: calculating an intra-class distance and an inter-class distance of the image of each class in the support set according to the image recognition model; and calculating the hardness of the image episode according to the intra-class distance and the inter-class distance.

Specifically, intra-class distances $d_{intra}^{C_i}$ and inter-class distances $d_{inter}^{C_i,C_j}$ of all classes in the support set are calculated according to the method for calculating intra-class distances and inter-class distances in step S102. Then, the hardness of the episode is calculated according to the following formula:

$$D = \frac{d_{intra}}{d_{inter}} = \frac{\frac{1}{N}\sum_{i=1}^{N} d_{intra}^{C_i}}{d_{inter}\frac{1}{N(N-1)}\sum_{i=1}^{N}\sum_{j=1,j\neq i}^{N} d_{inter}^{C_i,C_j}}$$

The recognition effect of the model may be evaluated according to the calculated hardness, and the hardness and the classification result are combined for evaluation. When the hardness is large, the classification effect of the image recognition model is good, which can show a good performance of the model.

Figure 3:
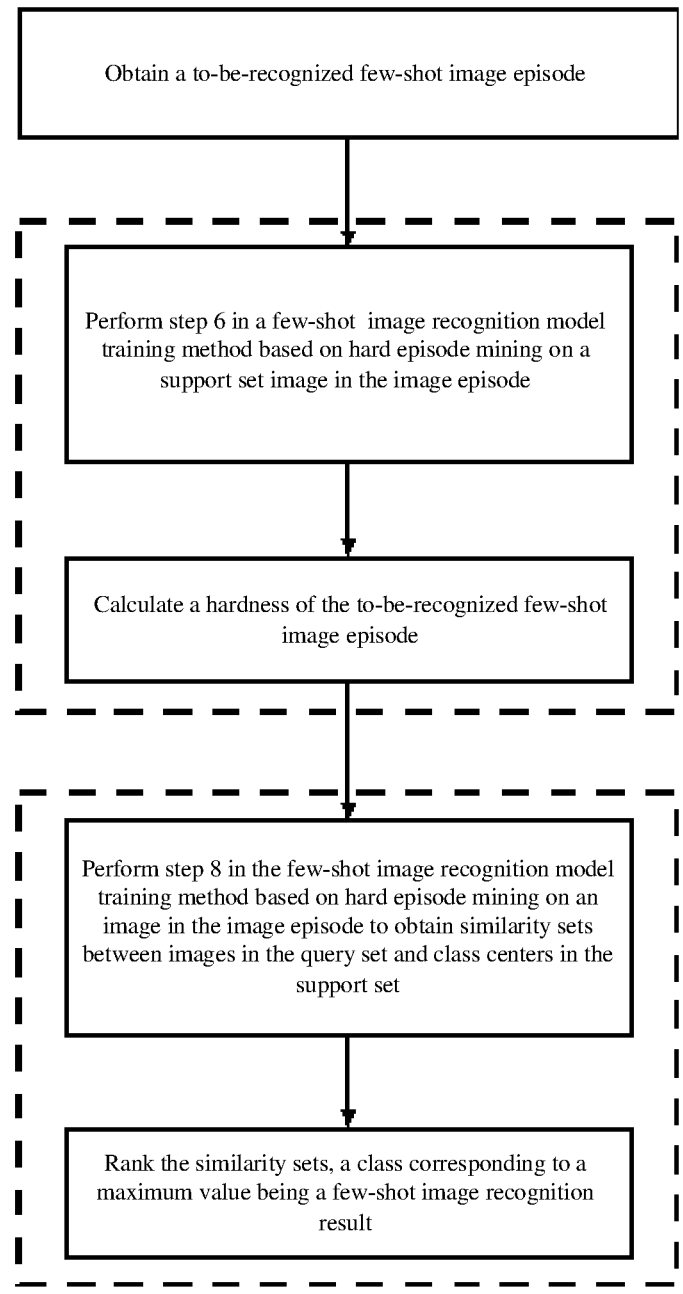
FIG. 3 is a schematic diagram of an image recognition method according to an exemplary embodiment.

FIG. 3 is a schematic diagram of a few-shot image recognition method. The few-shot image recognition method in an embodiment is described with reference to FIG. 3.

First, a to-be-recognized few-shot image episode is obtained. The image episode includes a support set and a query set, and has N classes.

Further, the support set of the image episode is inputted into a trained image recognition model, and the image recognition model calculates intra-class distances $d_{intra}^{C_i}$ and inter-class distances $d_{inter}^{C_i,C_j}$ of all classes in the support set. And a hardness of the episode is calculated according to the calculated intra-class distances and inter-class distances.

Further, the image recognition model calculates similarity sets $\hat{y}_m = \{\hat{y}_{m,n}\}_{n=1}^{N}$ between images in the query set and class centers in the support set, where $\hat{y}_{m,n}$ represents a similarity between the $m^{th}$ sample in the query set and class n. The similarity sets $\hat{y}_m$ are ranked, and value n corresponding to a maximum value is a few-shot image recognition result of sample m.

The few-shot image recognition method provided by the present embodiment shows an efficient hard episode searching method. Also, hard episodes are fused into a training process of a few-shot image recognition model, whereby the few-shot image recognition model can be trained more efficiently and quickly, the stability of the model can be improved, and the accuracy of few-shot image recognition can be improved. In addition, the few-shot image recognition method based on hard episode mining provided in the present embodiment can realize few-shot image recognition, and may also calculate a hardness of a to-be-recognized few-shot image episode and evaluate the model according to the hardness.

Figure 5:
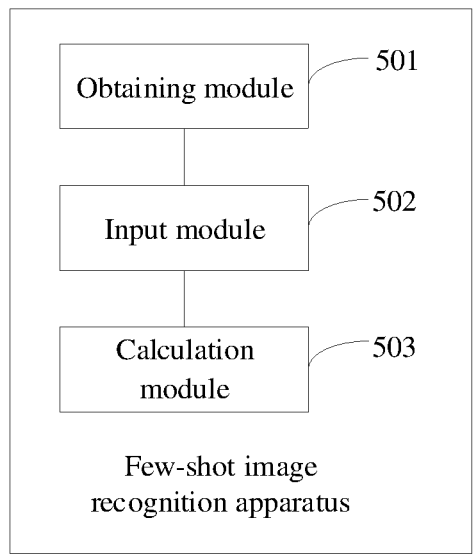
FIG. 5 is a schematic structural diagram of a few-shot image recognition apparatus according to an exemplary embodiment.

The embodiments of the present application also provide a few-shot image recognition apparatus. The apparatus is configured to perform the few-shot image recognition method in the foregoing embodiments. As shown in FIG. 5, the apparatus includes:

an obtaining module 501, configured to obtain to-be-recognized images, and construct an image episode according to the to-be-recognized image, the image episode including a support set and a query set;

an input module 502, configured to input the image episode into a pre-trained image recognition model, the image recognition model being a few-shot image recognition model based on hard episode training; and a calculation module 503, configured to calculate a similarity between an image in the query set and each class in the support set according to the image recognition model, and determine the class of to-be-recognized images in the query set according to the similarity.

It is to be noted that the few-shot image recognition apparatus provided in the foregoing embodiments are merely exemplified by the division of the functional modules when performing the few-shot image recognition method. In practical applications, the functional allocation may be performed by different functional modules as required. That is, the internal structure of the device is divided into different functional modules so as to complete all or part of the functions described above. In addition, the few-shot image recognition apparatus provided in the foregoing embodiments belongs to the same concept as the embodiments for the few-shot image recognition method. The implementation process thereof is detailed in the method embodiments and will not be repeated herein.

The embodiments of the present application also provide an electronic device corresponding to the few-shot image recognition method provided in the foregoing embodiments, so as to perform the few-shot image recognition method.

Figure 6:
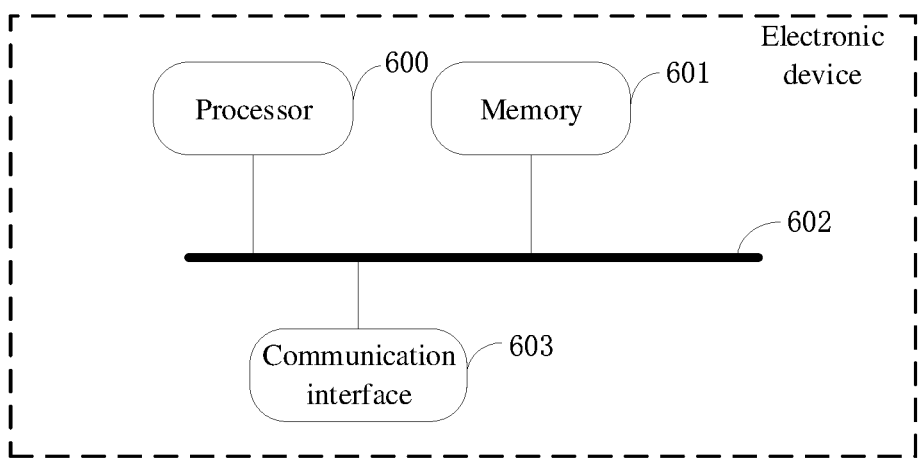
FIG. 6 is a schematic structural diagram of an electronic device according to an exemplary embodiment.

FIG. 6 shows a schematic diagram of an electronic device according to some embodiments of the present application. As shown in FIG. 6, the electronic device includes: a processor 600, a memory 601, a bus 602, and a communication interface 603. The processor 600, the communication interface 603, and the memory 601 are connected via the bus 602. The memory 601 stores a computer program executable on the processor 600. The computer program, when executed by the processor 600, performs the few-shot image recognition method provided by any of the foregoing embodiments of the present application.

The memory 601 may include a high-speed random access memory (RAM), and may also include a non-volatile memory, such as at least one disk memory. The communication connection between the system network element and at least one other network element is realized through at least one communication interface 603 (which may be wired or wireless), and the Internet, a wide area network, a local area network, a metropolitan area network, and the like may be used.

The bus 602 may be an ISA bus, a PCI bus, an EISA bus, or the like. The bus may be divided into an address bus, a data bus, a control bus, and the like. The memory 601 is configured to store a program, and the processor 600 executes the program after receiving an execution instruction. The few-shot image recognition method disclosed in any of the implementations of the embodiments of the present application may be applied to the processor 600 or implemented by the processor 600.

The processor 600 may be an integrated circuit chip having a signal processing capability. During implementation, the steps of the method may be completed by instructions in the form of integrated logic circuits in hardware or software in the processor 600. The processor 600 may be a general-purpose processor, including a central processing unit (CPU), a network processor (NP), and the like, and may also be a digital signal processor (DSP), an application specific integrated circuit (ASIC), a field programmable gate array (FPGA) or another programmable logic device, a discrete gate or transistor logic device, or a discrete hardware component. The various methods, steps, and logical block diagrams disclosed in the embodiments of the present application may be implemented or performed. The general-purpose processor may be a microprocessor or the processor may be any conventional processor. The steps of the methods disclosed in connection with the embodiments of the present application may be embodied directly as being completed by a hardware decoding processor, or by the combination of hardware and software modules in a decoding processor. The software module may be located in a RAM, a flash memory, a read-only memory (ROM), a programmable ROM, or an electrically erasable programmable memory, a register, or another storage medium well known in the art. The storage medium is located in the memory 601, and the processor 600 reads information in the memory 601 and, in conjunction with the hardware thereof, completes the steps of the method.

The electronic device provided by the embodiments of the present application and the few-shot image recognition method provided by the embodiments of the present application are based on the same inventive concept, and have the same beneficial effects as the method adopted, operated, or realized thereby.

Figure 7:
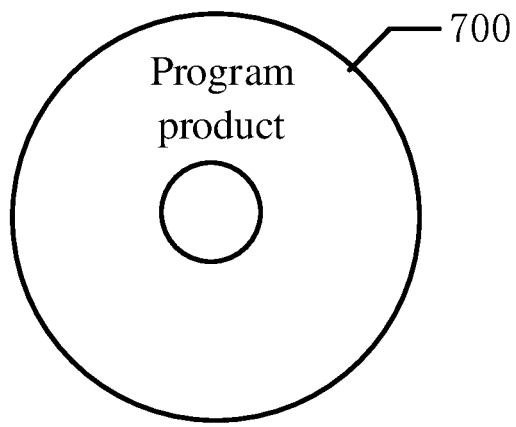
FIG. 7 is a schematic diagram of a computer storage medium according to an example embodiment.

The embodiments of the present application also provide a computer-readable storage medium corresponding to the few-shot image recognition method provided by the foregoing embodiments. A computer-readable storage medium shown in FIG. 7 is an optical disc 700, on which a computer program (namely, a program product) is stored. The computer program, when executed by a processor, may perform the few-shot image recognition method provided by any of the foregoing embodiments.

It is to be noted that examples of the computer-readable storage medium may include, but are not limited to, a phase-change random access memory (PRAM), a static random access memory (SRAM), a dynamic random access memory (DRAM), other types of RAMs, a ROM, an electrically erasable programmable read-only memory (EE-PROM), a flash memory, or other optical and magnetic storage media, which will not be described in detail herein.

The computer-readable storage medium provided by the foregoing embodiments of the present application and the few-shot image recognition method provided by the embodiments of the present application are based on the same inventive concept, and have the same beneficial effects as the method adopted, operated, or realized by an application stored therein.

The technical features of the foregoing embodiments may be combined in any form. In order to simplify the description, all possible combinations of the technical features in the foregoing embodiments are not described. However, insofar as the combinations of these technical features do not contradict, the combinations are to be considered within the scope of this description.

The foregoing embodiments express only a few implementations of the present invention, which are described in greater detail but are not to be construed as limiting the patent scope of the present invention. It will be appreciated by a person of ordinary skill in the art that numerous variations and modifications may be made without departing from the concept of the present invention. These variations and modifications fall within the protection scope of the present invention. Therefore, the protection scope of the present invention shall be determined by the appended claims.

The invention claimed is:

1. An electronic device, comprising a processor and a memory storing program instructions, the processor being configured to perform, when executing the program instructions, a few-shot image recognition method; the electronic device includes: a processor, a memory, a bus, and a communication interface; the processor, the communication interface, and the memory are connected via the bus; the memory stores a computer program executable on the processor; the memory includes a non-volatile memory; the few-shot image recognition method, comprising:

obtaining to-be-recognized images, and constructing an image episode according to the to-be-recognized images, the image episode comprising a support set and a query set;

inputting the image episode into a pre-trained image recognition model, the image recognition model being a few-shot image recognition model based on hard episode training;

calculating a similarity between an image in the query set and each class in the support set according to the image recognition model, and determining the class of to-be-recognized images in the query set according to the similarity;

calculating an intra-class distance and an inter-class distance of the image of each class in the support set according to the image recognition model; and calculating a hardness of the image episode according to the intra-class distance and the inter-class distance.

2. The method according to claim 1, before inputting the image episode into a pre-trained image recognition model, further comprising:

obtaining an image dataset and a default neural network model;

random sampling from the image dataset to obtain a randomly-sampled episode;

inputting the randomly-sampled episode into the neural network model, and calculating a similarity between a sample in the query set of the episode and each class in the support set;

calculating a loss function of the model according to the calculated similarity, optimizing model parameters by a back-propagation algorithm, and obtaining a trained feature sampling network when the loss function converges;

calculating intra-class distances and inter-class distances of all classes in the image dataset according to the feature sampling network, and sampling a hard episode according to the intra-class distances and the inter-class distances;

inputting the hard episode into the feature sampling network, and calculating a similarity between a sample in the query set in the hard episode and each class in the support set; and calculating the loss function of the model according to the calculated similarity, optimizing the model parameters by the back-propagation algorithm, and obtaining a trained image recognition model when the loss function converges.

3. The method according to claim 2, wherein the random sampling from the image dataset to obtain a randomly-sampled episode comprises:

obtaining image classes in the image dataset;

randomly sampling a default number of samples from each image class, and forming a support set and a query set from the sampled samples; and combining the support set and the query set into an episode to obtain the randomly-sampled episode.

4. The method according to claim 2, wherein the inputting the randomly-sampled episode into the neural network model and calculating a similarity between a sample in the query set of the episode and each class in the support set comprises:

inputting the episode into the neural network model, and calculating a class center of each class in the support set; and calculating a similarity between the sample in the query set and the class center of each class in the support set.

5. The method according to claim 2, wherein the calculating intra-class distances and inter-class distances of all classes in the image dataset according to the feature sampling network comprises:

calculating the intra-class distance according to the following formula:

$$d_{intra}^m = \frac{1}{N_m}\sum_{i=1}^{N_m} G[F'(x_{mi}), P_m]$$

wherein F'(•) is a feature sampling network, G (•,•) is a squared Euclidean distance, $x_{mi}$ is the ith sample of class m, $N_m$ is the number of all samples of class m, $$P_m = \frac{1}{N_m}\sum_{i=1}^{N_m} F'(x_{mi})$$

is a class center of class m, and $d_{intra}^m$ is an intra-class distance of class m; and calculating the inter-class distance according to the following formula:

$d_{inter}^{m,n} = G[P_m, P_n]$ wherein $$P_n = \frac{1}{N_n}\sum_{i=1}^{N_n} F'(x_{ni})$$

is a class center of class n, and $d_{inter}^{m,n}$ inter is an inter-class distance between class m and class n.

6. The method according to claim 2, wherein sampling a hard episode according to the intra-class distances and the inter-class distances comprises:

randomly sampling a target class from all the classes, and collecting all combinations comprising the target class;

calculating Inverse-Fisher values of all the collected combinations according to the intra-class distances and the inter-class distances, and ranking the combinations comprising the target class according to a descending order of the Inverse-Fisher values; and counting the number of combinations comprising the target class, randomly selecting a combination from a default number of top-ranked combinations, forming a support set and a query set according to a class set sample in the combination, and obtaining the hard episode according to the support set and the query set.

* * * * *